C. H. WILLIAMS, Jr.
BRAKE LEVER STRUT.
APPLICATION FILED JULY 15, 1909.

951,166.

Patented Mar. 8, 1910.
2 SHEETS—SHEET 1.

WITNESSES

INVENTOR
C. H. WILLIAMS JR.
BY
ATT'Y.

C. H. WILLIAMS, Jr.
BRAKE LEVER STRUT.
APPLICATION FILED JULY 15, 1909.

951,166.

Patented Mar. 8, 1910.
2 SHEETS—SHEET 2.

Witnesses

Inventor:
C. H. Williams, Jr.
by
F. R. Cornwall, Atty.

UNITED STATES PATENT OFFICE.

CHARLES H. WILLIAMS, JR., OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-LEVER STRUT.

951,166.  Specification of Letters Patent.  Patented Mar. 8, 1910.

Application filed July 15, 1909. Serial No. 507,764.

*To all whom it may concern:*

Be it known that I, CHARLES H. WILLIAMS, Jr., a citizen of the United States, residing at Chicago, Illinois, have invented a certain new and useful Improvement in Brake-Lever Struts, of which the following is a full, clear, and exact description, such as will enable others skilled in the art to which it appertains to make and use the same, reference being had to the accompanying drawings, forming part of this specification, in which—

Figure 1:
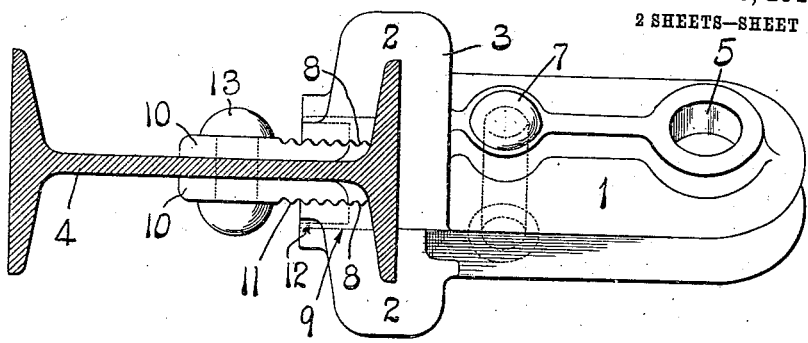
Figure 2:
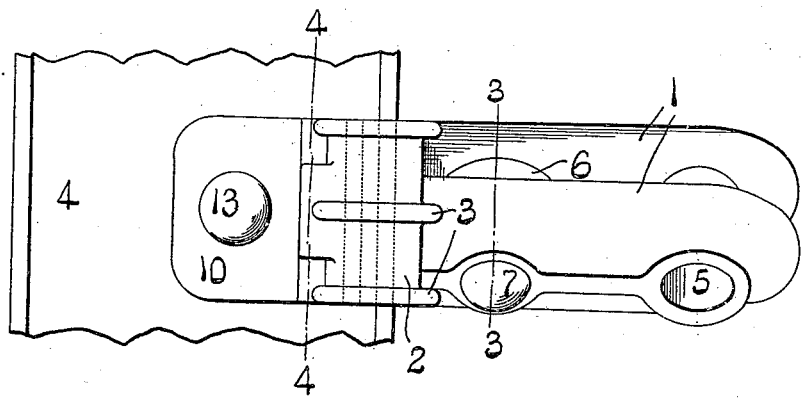
Figure 3:
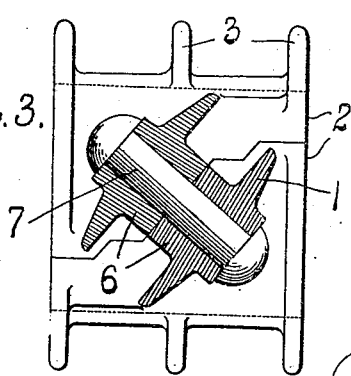
Figure 4:
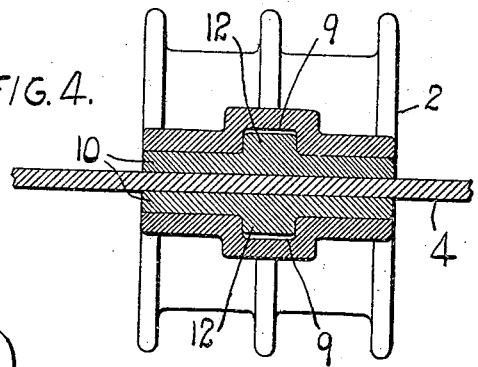
Figure 5:
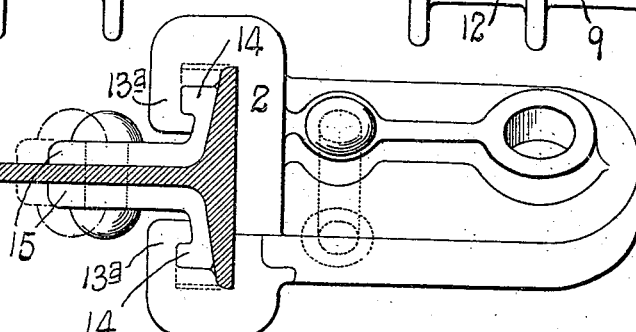
Figure 6:
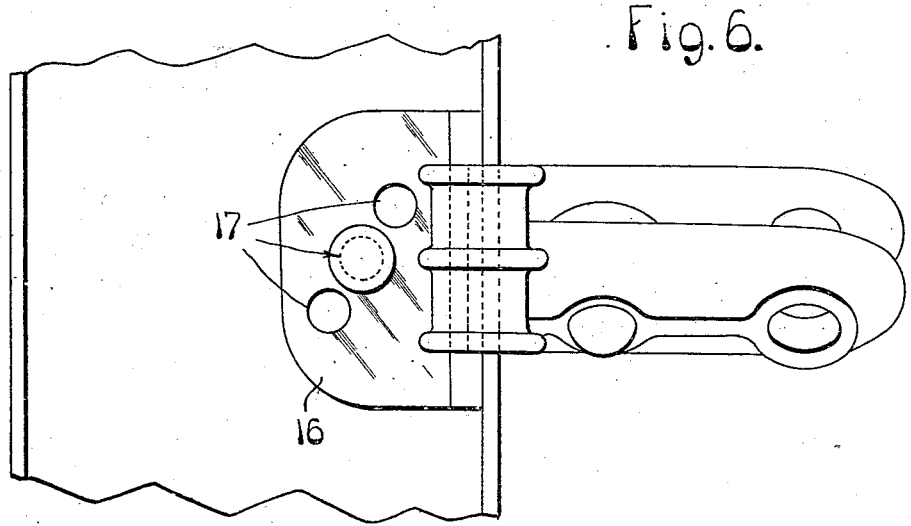
Figure 7:
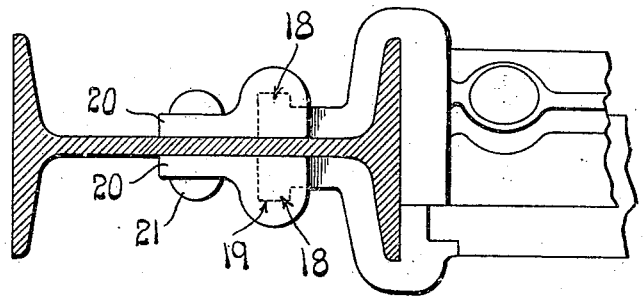

Figure 1 is a side elevation of a fulcrum of my improved construction, the same being shown in position on a brake beam. Fig. 2 is a plan view of the fulcrum and a portion of the beam to which said fulcrum is attached. Fig. 3 is an enlarged cross section taken on the line 3—3 of Fig. 2. Fig. 4 is an enlarged cross section taken on the line 4—4 of Fig. 2. Fig. 5 is an elevation of a modified form of my improved fulcrum. Fig. 6 is a plan view of a further modified form of the fulcrum. Fig. 7 is an elevation of a further modified form of the fulcrum with parts thereof broken away.

My invention relates to an improved brake beam fulcrum which receives the brake lever, and which is formed in mating parts in order that it may be readily assembled and positioned upon the brake beam.

In the various types of solid brake beams now in general use, the fulcrums have been fastened by means of rivets or the like, which pass through apertures formed through the beam at various distances from the face of the flange of the beam, and the principal object of my invention is to provide a fulcrum which may be readily located on the prevailing types of solid beams, regardless of the location of the rivet hole in said beams.

To the above purposes, my invention consists in certain novel features of construction and arrangement of parts hereinafter more fully described and claimed.

As shown in the drawings, my improved fulcrum is constructed in mating parts, each part comprising a plate 1, with the rear end of which is formed integral a head 2, provided with strengthening flanges 3 and of such shape as to embrace and fit snugly upon the flange of the solid brake beam 4 of the ordinary type. The plates 1 lie parallel to one another and are formed at angles on the heads 2, and thus the space between said plates, which is occupied by the brake lever, occupies an inclined position relative to the horizontal plane occupied by the brake beam.

Formed through the outer portions of the plates 1 are alined apertures 5, which receive the pin or bolt, of ordinary construction, upon which the brake lever is pivoted.

Formed integral with the inner faces of the plates 1, adjacent the point where they join the heads 2, are spacing lugs 6, and formed therethrough are apertures which receive a rivet 7, thus rigidly uniting the mating parts of the fulcrum.

The under sides of the rear portions of the heads 2 are provided with transversely disposed ribs or corrugations 8, and formed in the ends of said heads are notches or recesses 9.

10 designates plates which are positioned on opposite sides of the web of the beam, and the outer faces of the forward end of said plates are provided with transverse ribs or corrugations 11 which are adapted to interlock with the ribs or corrugations 8. Formed integral with the forward portions of the plates 10 are lugs 12, which, when the parts are assembled, occupy the recesses 9 in the heads 2. The plates 10 are rigidly fixed on the beam by means of a rivet 13, which passes through suitably formed apertures in said plates, and through the usual fulcrum aperture formed through the web of the brake beam. By making these plates separate from the fulcrum and providing the interlocking joint between said plates and fulcrum, said plates can be located at various points on the beam corresponding to the fulcrum aperture therein. For instance, the plates which have been positioned on a beam where the fulcrum hole is two and one half inches from the face of the flange, can be removed and fastened on a beam where the fulcrum hole is two inches or an inch and three-quarters from the face of the beam, and the interlocking engagement between said plates and the heads of the two-part fulcrum will be maintained regardless of the position of said plates relative to the face of the flange.

In the form of fulcrum shown in Fig. 5, the rear portions of the heads 2 are formed into hooks 13ª, which engage corresponding hooks 14 on the ends of clips 15, which latter are made in various sizes in order to receive the rivets used in rigidly fixing said clips on the beam, said rivets passing through the fulcrum holes located at different distances from the face of the flange of the beam.

In Fig. 6, I have shown a modified construction wherein the heads of the fulcrum are interlocked with plates 16, each of which is provided with a series of apertures 17 located at different distances from the face of the flange of the beam, which apertures receive the rivet which passes through the fulcrum hole in the beam. By this construction, the fulcrum is placed slightly off center, but not to such a degree as to affect the successful operation of the brake lever, as the same will accommodate itself to the fulcrum if the same be placed within reasonable limits on the beam.

In Fig. 7, I have shown a modified construction wherein the rear portions of the heads are provided with lugs 18 which are normally seated in recesses 19 formed in clips 20, which are fixed to the web of the beam by means of a rivet 21. These clips are made in various sizes in order to accommodate the rivets seated in the fulcrum holes, which, as hereinbefore stated, are formed at various distances from the face of the flange of the beam.

A fulcrum of my improved construction is comparatively simple, comprises a minimum number of parts, and is particularly adapted for universal use on the prevailing types of solid beams wherein the fulcrum holes are located at different distances from the face of the flange of the beam.

It will be readily understood that minor changes in the construction and form of my improved fulcrum can be made and substituted for those herein shown and described without departing from the spirit of my invention.

I claim:

1. The combination with a brake lever fulcrum, of longitudinally adjustable members connecting said fulcrum with a brake beam.

2. The combination with a brake lever fulcrum, of longitudinally adjustable members connecting said fulcrum with a brake beam, and there being an interlocking engagement between said fulcrum and said members.

3. The combination with a brake beam, of longitudinally adjustable clips fixed thereto, and a brake lever fulcrum, there being interlocking engagement between said fulcrum and clips.

4. The combination with a brake beam, of clips fixed thereto, and a two-part brake lever fulcrum arranged on the beam and engaged by the clips thereon.

5. The combination with a brake beam, of clips fixed thereto, a two-part brake lever fulcrum arranged on the beam and engaged by the clips thereon, and means rigidly uniting the two parts of the fulcrum.

6. A brake lever fulcrum formed in mating parts, and clips having interlocking engagement with the two parts of the fulcrum and adapted to engage the brake beam on which the fulcrum is located.

7. The combination with a brake beam, of clips fixed thereon, a two-part fulcrum engaged by the clips, and means for rigidly connecting the two parts of the fulcrum.

8. A brake lever fulcrum comprising a lever mounting part, and a part for attachment to the beam, said parts being adjustably connected together, whereby the attaching part is adapted to accommodate differently positioned rivet holes.

9. In a brake lever fulcrum, a lever mounting part having fixed relation to the brake beam, and a beam attachment part having adjustable relation to said lever mounting part.

10. In a brake lever fulcrum, a lever mounting part, and a beam attachment part, which latter is preferably and adjustably connected to the former, so as to accommodate differently positioned rivet holes.

11. In a brake lever fulcrum, a lever mounting part and a beam attachment part, which latter is capable of accommodating itself to variously positioned rivet openings in the beam.

In testimony whereof I hereunto affix my signature in the presence of two witnesses, this 2 day of July, 1909.

CHARLES H. WILLIAMS, Jr.

Witnesses:
EDWARD T. WALKER,
JOSEPH W. WEINLAND.